May 19, 1970     D. B. MARLEY     3,512,504
MILKING CLAW PROTECTOR
Filed Nov. 9, 1967
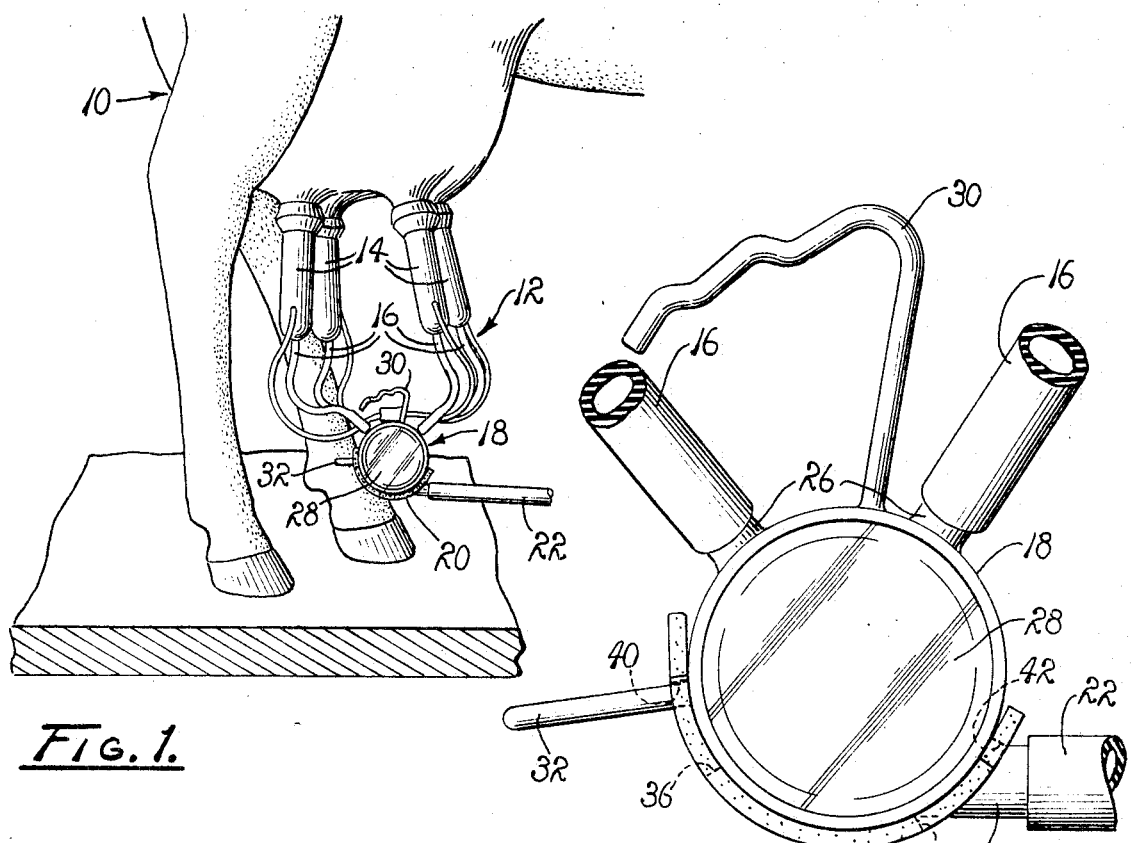
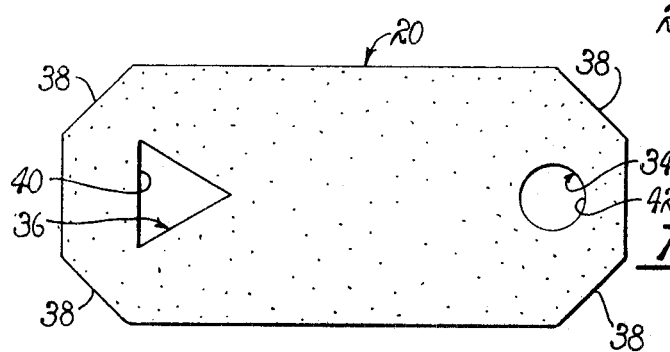
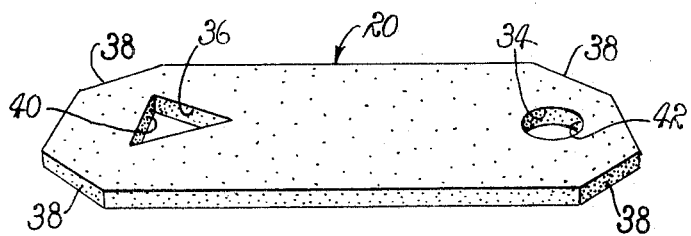
DANIEL B. MARLEY
INVENTOR
Huebner & Worrel
ATTORNEYS

United States Patent Office 3,512,504
Patented May 19, 1970

3,512,504
MILKING CLAW PROTECTOR
Daniel B. Marley, 3125 N. Milburn,
Fresno, Calif. 95705
Filed Nov. 9, 1967, Ser. No. 681,758
Int. Cl. A01j 7/00
U.S. Cl. 119—14.54          7 Claims

ABSTRACT OF THE DISCLOSURE

Protector for a milking claw having oppositely directed lateral projections, the protector being in the form of a pad of resilient material of elongated shape having a perforated opening at each end thereof, one opening being adapted to receive one of the projections and the pad to be stretched around the underside of the milking claw for reception of the other lateral projection in the other opening, the pad having transverse dimensions greater than similarly directed dimensions of the claw to provide protective edges extending therebeyond on both sides thereof.

Background of the invention

The present invention relates to the milking of cows by machines and more particularly to a pad of material utilized for the protection of a milking claw commonly employed in the use of such machines.

The milking machines are usually attached to the udders of the cow by means of teat cups, each containing an inflation device adapted to be pulsated by periodic application of pressure and vacuum of suction, and connected by milk tubes or hoses to a milking claw, the milking claw being connected by a hose or conduit to a container or other receptacle in which the milk is collected. The milking claw is ordinarily provided with windows for viewing the flow of milk therethrough which serves as a visual check on the proper functionng of the milking machine. The milking claw is usually suspended above the floor of the milking area by means of the aforementioned milk tubes. Often times the milking claw falls to the floor or ground because of the teat cups or inflation devices losing their hold on the cow's udders or from being kicked loose by the cow, resulting in the windows of the milking claw breaking or popping out or other damage being inflicted. Mishaps may also occur in the handling of the milking claw in the attachment of the milking machine to the cow or in the cleaning of the claw.

Summary of invention

It is therefore an object of the present invention to provide a protector for a milking claw.

Another object is to provide a pad of material and means for attaching the same to a milking claw for the protection thereof.

A further object is to provide a pad of material suitbly secured to a milking claw and functioning as a buffer or proective layer between the milking claw and any damaging surface upon which it may happen to fall.

These and other objects and advantages are achieved by the provision of a pad of resilient material of elongated shape with a perforated opening adjacent each end thereof, the dimensions of the pad and the openings being such that the pad is disposed to wrap around the underside of the mlking claw between two oppositely directed lateral projections, one of the projections being received in one of the openings in the pad and the pad being stretched in order to receive the other propection in the other of said openings, thus providing a protective layer disposed in wrap-around relation to the aforementioned underside of the milking claw and extending transversely therebeyond on both sides thereof.

Brief description of drawing

FIG. 1 is a fragmentary perspective view of a milking machine applied to the udders of a cow and illustrating environmental use of the milking claw protector of the present invention.

FIG. 2 is a larger scale side elevation of the milking claw showing a protector embodying the principles of the present invention attached thereto.

FIG. 3 is a plan view of a protective pad of material formed in accordance with the principles of the present invention.

FIG. 4 is a perspective view of the protective pad of material shown in FIG. 3.

Description of embodiment

Referring to the drawing, there is illustrated in FIG. 1 the hind portion of a cow 10 to the udders of which a conventional milking machine 12 is attached. The milking machine includes the usual teat cups 14 in which the udders are received and contains the usual inflation devices which are periodically pulsated by the application of pressure and vacuum or suction for massaging the udders and inducing the flow of milk therefrom. Milk tubes or hoses 16 connected to the teat cups 14 receive the milk and conduct it to a milking claw 18 to which a protector 20 embodying the principles of the present invention is attached, the milk being conducted away from the milking claw by a hose or conduit 22.

Turning to FIG. 2, it will be noted that the milking claw is of conventional type having a cylindrical body of metal or other suitable material with a tangentially disposed tube or pipe 24 and four divergently directed, obliquely disposed pipes or tubes 26, the several tubes or pipes all communicating with the interior of the milking claw. Pipes 26 are received in the ends of the milk tubes or hoses 16, pipe 24 being received in one end of the conduit 22. The axial ends of the cylindrical body of the milking claw 18 are closed off by windows 28 of suitable material for viewing of the passage of milk therethrough. The milking claw is also provided with a support hook or hanger 30 and a handle or U-shaped bracket 32 oppositely directed laterally from the pipe 24. As seen best in FIG. 2, the protector 20 is adapted to be attached so as to be disposed in wrap-around relation to the underside of the milking claw 18 and has edge portions which extend transversely beyond the windows 28.

Referring to FIGS. 3 and 4, the protector 20 is fashioned from a pad or piece of resilient material such as rubber, plastic and the like. The pad is of elongated form with a circular perforation or opening 34 for the reception of the pipe 24, the other end of the pad having a triangular opening 36 therethrough in which the handle or bracket 32 is adapted to be received. If desired, the corners of the pad may be cut off or bevelled, as at 38.

The protector pad 20 is so dimensioned that the distance between the side 40 of triangular opening 36 and the point 42 on the periphery of opening 36 most distant therefrom is substantially equal to the distance between the far sides of the pipe 24 and bracket 32 as measured in wrap-around manner about the underside of the milking claw 18 therebetween. The transverse dimensions of the pad 20 should at least be equal to the transverse dimensions of the cylindrical body of the claw 18 and preferably be wider to provide protective edges extending beyond the planes of the windows 28, somewhat in the manner of arcuate flanges. The flange-like protective edges cooperate with the obliquely disposed pipes 26 to space the windows 28 from a surface when the claw 18 is on its side. Thus, when the milking claw drops to the floor or ground, the pad of material 20 provides a resilient layer or buffer for absorbing the shock of the fall or impact and preventing damage to the claw.

In attaching the protector of the present invention to a milking claw of the type hereinbefore described, with the conduit 22 off of the pipe 24, the pipe is inserted into the opening 34 of the pad 20 and the adjacent end of the pad is worked along the pipe until it is contiguous to the cylindrical body of the claw. The other end of the pad is then grasped and the triangular opening 36 adjacent thereto is worked up, stretching the pad as necessary, so that the bracket 32 is received into the opening 36, whereupon the end of the pad is pressed into contact with the cylindrical body of the claw to dispose the pad in wrap-around relation to the underside thereof. Bevelling the corners of the pad results in a reduction of material adjacent the openings 34 and 36 which must be deformed in stretching the pad over the projections 24 and 32, thereby facilitating attachment.

It will be appreciated, of course, that the pad 20 could be attached in other ways to serve its purpose. The main thing is that the claw be provided with a layer of resilient material wrapped around its underside to prevent direct contact thereof with a hard or damaging surface. Moreover, with the pad dimensioned to have edges extending beyond the planes of the windows 28, additional protection is provided in case the milking claw should fall on its side. Of course, if something were to fall on the claw, the pad 20 attached thereto would afford a measure of protection.

Operation

The operation of the device of the present invention is believed to be clearly apparent and is briefly summarized at this point. With the protective pad 20 suitably attached to the milking claw 18 and the claw connected to the hoses 16 and conduit 22, should the claw fall to the floor or ground, for whatever reason, the pad provides a protective layer or buffer which absorbs the energy and shock of the impact and cushions the fall. The same protective purpose of the pad is performed in the event the milking claw is dropped during cleaning or other handling thereof.

There has thus been provided a protector for a milking claw which is of simple and inexpensive construction, yet is highly effective in the prevention of damage to a milking claw which would otherwise render it inoperable or impair its efficiency.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A protector for a milking claw having a closed lower side comprising a resilient pad of a shape to conform to a lower side of the claw so as to be disposed in intimately facing covering relation to said lower side thereof, and means including spaced openings provided in the pad for releasably stretchably attaching said pad to said claw.

2. The protector of claim 1 wherein the claw has opposite axially spaced sides and said pad is dimensioned to provide protective edges extending laterally beyond the sides of said claw.

3. The protector of claim 1 wherein said claw has spaced projections directed away from the lower side thereof, and said spaced openings in the pad individually engaging said projections for stretchable attachment thereof to said claw.

4. The protector of claim 3 wherein said pad is of elongated form with transverse dimensions greater than the transverse dimensions of the lower side of said claw and longitudinal dimensions at least equal to the distance between said projections measured in wrap-around relation with respect to the lower side of the claw.

5. A protector for a milking claw having a closed lower side, opposite axially spaced sides, and spaced projections directed away from the lower side thereof; comprising an elongated pad of resilient material disposed in intimately facing covering relation to the lower side of the claw and having a transverse dimension greater than the transverse dimension of the lower side of said claw to provide protective edges extending laterally beyond the sides of said claw and a longitudinal dimension at least equal to the distance between said projections measured in wrap-around relation with respect to the lower side of the claw, said pad including opposite ends; and a pair of spaced perforations formed through the pad individually adjacent to said opposite ends with said perforations being adapted to receive said projections for stretching therebetween and covering the lower side of the claw.

6. The protector of claim 5 wherein said underside of said claw is arcuate and one of said projections is a tubular member related substantially tangentially thereto, and one of said perforations is a circular opening in which said tubular member is received.

7. The protector of claim 6 wherein the other of said projections is a bracket directed substantially radially from said arcuate underside of the claw, the other of said perforations is a triangular opening adapted to receive said bracket, and the pad has bevelled portions adjacent to said openings.

References Cited

UNITED STATES PATENTS 2,922,394   1/1960   Jansson _____ 119—14.55
3,172,391   3/1965   Norton _____ 119—14.01 X HUGH R. CHAMBLEE, Primary Examiner